United States Patent [19]

Stapleton

[11] Patent Number: 5,732,864
[45] Date of Patent: *Mar. 31, 1998

[54] ARTICLE CARRIER CROSSBAR WITH SPLIT STANCHION CLAMP

[75] Inventor: Craig A. Stapleton, Clarkston, Mich.

[73] Assignee: Advanced Accessory Systems LLC, Port Huron, Mich.

[*] Notice: The term of this patent shall not extend beyond the expiration date of Pat. No. 5,573,161.

[21] Appl. No.: 665,479

[22] Filed: Jun. 18, 1996

Related U.S. Application Data

[63] Continuation-in-part of Ser. No. 362,277, Dec. 22, 1994, Pat. No. 5,573,161.

[51] Int. Cl.[6] .................................................. B60R 9/04
[52] U.S. Cl. ............................ 224/321; 224/309; 224/322
[58] Field of Search .................................. 224/309, 314, 224/315, 321, 322, 325, 326, 329, 330, 331

[56] References Cited

U.S. PATENT DOCUMENTS

| | | | |
|---|---|---|---|
| 4,487,348 | 12/1984 | Mareydt | 224/321 |
| 4,673,119 | 6/1987 | Bott | 224/309 |
| 5,014,893 | 5/1991 | Morley et al. | 224/321 |
| 5,104,018 | 4/1992 | Dixon | 224/321 |
| 5,133,490 | 7/1992 | Cucheran | 224/321 |
| 5,143,267 | 9/1992 | Cucheran et al. | 224/321 |
| 5,170,920 | 12/1992 | Corrente et al. | 224/321 |
| 5,190,198 | 3/1993 | Cucheran | 224/321 |
| 5,203,483 | 4/1993 | Cucheran | 224/321 |
| 5,253,792 | 10/1993 | Foster et al. | 224/309 |
| 5,320,264 | 6/1994 | Weir | 224/321 |
| 5,326,007 | 7/1994 | Pudney et al. | 224/321 |
| 5,375,750 | 12/1994 | Mandarino et al. | 224/321 |
| 5,385,285 | 1/1995 | Cucheran et al. | 224/321 |
| 5,573,161 | 11/1996 | Stapleton | 224/321 |
| 5,577,650 | 11/1996 | Stapleton | 224/321 |

*Primary Examiner*—Henry J. Recla
*Assistant Examiner*—Gregory M. Vidovich
*Attorney, Agent, or Firm*—Rader, Fishman & Grauer PLLC

[57] ABSTRACT

An article carrier including a pair of side rails, each of the side rails having a styled arm and a lip, also includes a crossbar having first and second ends for supporting the bar upon the lip of the side rails. The ends can be a manipulated retainer or a clamp assembly with a moveable jaw. At least one of the ends includes a clamp with a movable jaw and a fixed jaw, each jaw having a jaw surface engageable with the rail lip. Preferably, the crossbar clamp includes a threaded stem carried by the movable jaw and extending through an opening in the fixed jaw and one of the jaws has an extension protruding beyond the lip. The movable jaw is movable in a plane parallel to the rail lip and between a position in registration with the lip surface and a retracted position out of registration with the lip. The side rail includes support structure including ribs extending across the lip and the styled arm, and the support structure preferably receives the jaw extension beyond the lip.

25 Claims, 6 Drawing Sheets

ARTICLE CARRIER CROSSBAR WITH SPLIT STANCHION CLAMP

TECHNICAL FIELD

This application is a continuation-in-part of application Ser. No. 08/362,277, filed Dec. 22, 1994, now U.S. Pat. No. 5,573,161.

The present invention relates generally to article carriers for mounting on motor vehicle panels that include, a pair of spaced, elongated rails that are styled and include a lip, holding a crossbar end.

BACKGROUND ART

Many known article carriers for mounting to motor vehicle body panels include a pair of spaced side rails and crossbars supported or carried by the panel mounted rails. While many previous crossbars were mounted only at discrete positions along the side rail, fixed positioning of the rail limits the utility of the carrier. In particular, the luggage rack may not be adapted to fit particularly sized luggage or the like without remounting the rails to the vehicle panel. Many such carriers are assigned for strength or utility without regard to the vehicle body styling on which the carrier is mounted.

Improvements permitting variation in the position of each crossbar with respect to the side rails complicate the structures required to maintain strength while adding selective mobility to the components, and previous latches required numerous parts that are often difficult to operate. For example, U.S. Pat. No. 4,270,681 to Ingram discloses a luggage carrier adapted for sliding adjustment in a carrier track. The bracket is particularly shaped to fit within the restricted opening track. The restricted opening retains the bracket within the track along the length of the rail. Nevertheless, the locking mechanism for securing the bracket in a fixed position along the rail requires the use of a special tool. The tool not only has a special shape for fitting within an actuating member of the locking mechanism, but also requires a particular handle shape in order to reach the actuating member that is recessed within an opening at the bottom of the bracket.

U.S. Pat. Nos. 4,162,755 and 4,274,570 disclose luggage carriers in which a crossrail is supported by a pair of stanchions in U.S. Pat. No. 4,234,570, each stanchion includes a member that is captured within a track formed in a rail member. Moreover, while the locking mechanism is actuated by a turnable wheel, the wheel is exposed exteriorly of the sides of the stanchion so that it is accessible even though hidden below the top of the stanchion. As a result, the turnable wheel protrudes beyond the styling lines of the crossrail stanchion. U.S. Pat. No. 4,162,755 discloses a luggage carrier with a threaded stem carried by the turnable wheel and engageable in the threaded recess of a mounting plate secured by fastening or the like to the vehicle panel, and does not have an elongated track for changing the position of the crossrail on the vehicle panel.

U.S. Pat. No. 5,232,138 to Cucheran discloses bracket members supporting a crossbar laterally between and secured adjacent opposite ends to bracket members carried upon slats secured to the motor vehicle. The brackets disclose actuating means pivotable about a fixed pivot shaft and within the vertical plane extending through the restraining bar. The actuating means is carried within a recessed portion of the bracket member and is manually movable between the locked position where an outer surface is flush with the outer surface of the bracket. A locking means is responsive to the actuating means for raising a hook member in to tight engagement with the rail. The actuating means is extended outwardly beyond the outer surface of the bracket member when the locking means is disengaged. The hook member of the actuating means is separately constructed from the stanchion members and thus does not form a split stanchion clamp jaw that structurally enclose the rail within portions of the bracket.

An article carrier shown in U.S. Pat. No. 5,205,453 to Pudney et al. includes a crossbar support that employs a retractable lock pin selectively engageable in a plurality of longitudinally spaced apertures in a side rail. A pushbutton is exposed at the outer surface of the support member. While the support member has surfaces that mate with surfaces of the rail to support a load, the forces exerted against the rack during vehicle operation tending to separate the support member from the rail must be resisted by the retractable lock pin.

U.S. Pat. No. 4,487,348 discloses rail structure in which the side rails are provided with a lip engaged by a clamp on the crossrail. A first member of the cross rail clamp lays over a portion of the rail lip to support down loads imposed on the crossrail. A second member pivots at one end with respect to the first member to move the other end into and out of engagement with the lower surface of the rail lip. A threaded adjuster clamps the upper and lower members against the rail lip but is hidden beneath the rail, or reduced in size and recessed within the exposed exterior surface of one of the clamp members. Thus, the clamp actuator is constructed in a way tending to obscure access to the adjuster in order to avoid interference with styling.

SUMMARY OF THE PRESENT INVENTION

The present invention overcomes the above-mentioned disadvantages by providing an article carrier with stylized side rails having a reinforced lip, and a crossbar including an easily accessed and manipulated actuator for the clamp which releases a jaw for displacement away from the rail lip. The actuator is exposed above the clamp in a readily accessible and exposed area of the upper jaw for ease of operating the clamp, but without obscuring styling of the overall shape of the rails or crossbar end. The clamp and the side rails include reinforcements that permit styled compatible surfaces on the components to be structurally rigid while improving vehicle styling.

In a preferred embodiment, the crossbar includes a clamp and actuator as described above at one end of the crossbar, while the other end includes a slidably insertable retainer which may be inserted into a rail at an inclined position and lockingly engaged with the adjacent rail when the other end is pivoted down into engagement with the opposite rail. Preferably, the retainer is in the form of a T-shaped section which is insertable through an opening in the rail and becomes aligned behind retaining walls of the rail as the opposite end of the crossbar is moved to its installed position on the opposite rail. Alternatively, both ends of the crossbar may include clamps constructed according to the present invention.

In a preferred embodiment, the clamp includes a slidably movable jaw carrying a threaded stem engaged with a rotary wheel. The threaded stem passes through an opening in a fixed jaw so that threaded stem is displaceable along the opening within the fixed jaw. In this manner, the rotary wheel can be grasped to displace the movable jaw into and out of registration with the lip of the side rail. In one version, the opening is an elongated slot in the fixed jaw member and aligned so that the movable jaw is retractable from the lip in a direction substantially parallel to the adjacent lip surface registering with the movable jaw surface. Another form of the jaw structures according to the present invention enables the movable jaw to be rotated away from registration with the lip surface in a direction substantially parallel to the lip surface of the side rail. In addition, although it is preferable that at least one of the jaws includes a protrusion extending into a recess in the rail for fixed location alignment, the protrusion is preferred in the upper fixed jaw so that the movable jaw can be displaced, in a direction substantially parallel to the rail lip surface, with only a relatively small number of turns of the threaded stem to release the movable jaw. On the other hand, the jaw, the protrusion or both can be extended beyond the lip to reinforce the structural integrity of the joint.

As a result, the present invention provides an easily operated, styled luggage carrier which is rugged and can be selectively or singularly positioned along the length of the side rails forming a luggage carrier. The present invention provides the advantage that a simple clamping mechanism reduces the physical effort required to selectively clamp, position or remove the crossbar from the side rails of the luggage carrier. It is also an advantage of the present invention to provide an easily installable crossbar for luggage carriers in which one end of the crossbar may be lockingly engaged with a side rail by insertion of the crossbar at an inclined angle and realignment of the crossbar so that the opposite end engages the opposite rail. In addition, this advantage of the present invention provides a crossbar having only single clamping mechanism on one end of the crossbar so that insertion and engagement of both ends of the crossbar can be accomplished from one side, preferably the road shoulder side, of the vehicle.

In addition, the present invention provides the advantage that the clamp for engaging the lip of a side rail includes a movable jaw as well as an actuator that is movable in the direction of the lip surface from a position in registration with the jaw surface to a retracted position spaced away and not in registration with the lip surface. In addition, the luggage carrier preferably includes a pair of removable crossbars having the insertably engageable ends and easily accessed clamps and clamp actuators for installation from a single side of the vehicle that improve the styling of the vehicle while reinforcing the joints between the movable parts.

BRIEF DESCRIPTION OF THE DRAWINGS

The present invention will be better understood by reference to the following detailed description in which like reference characters refer to like parts throughout the views and in which.

DETAILED DESCRIPTION OF THE PREFERRED EMBODIMENT

Figure 1:
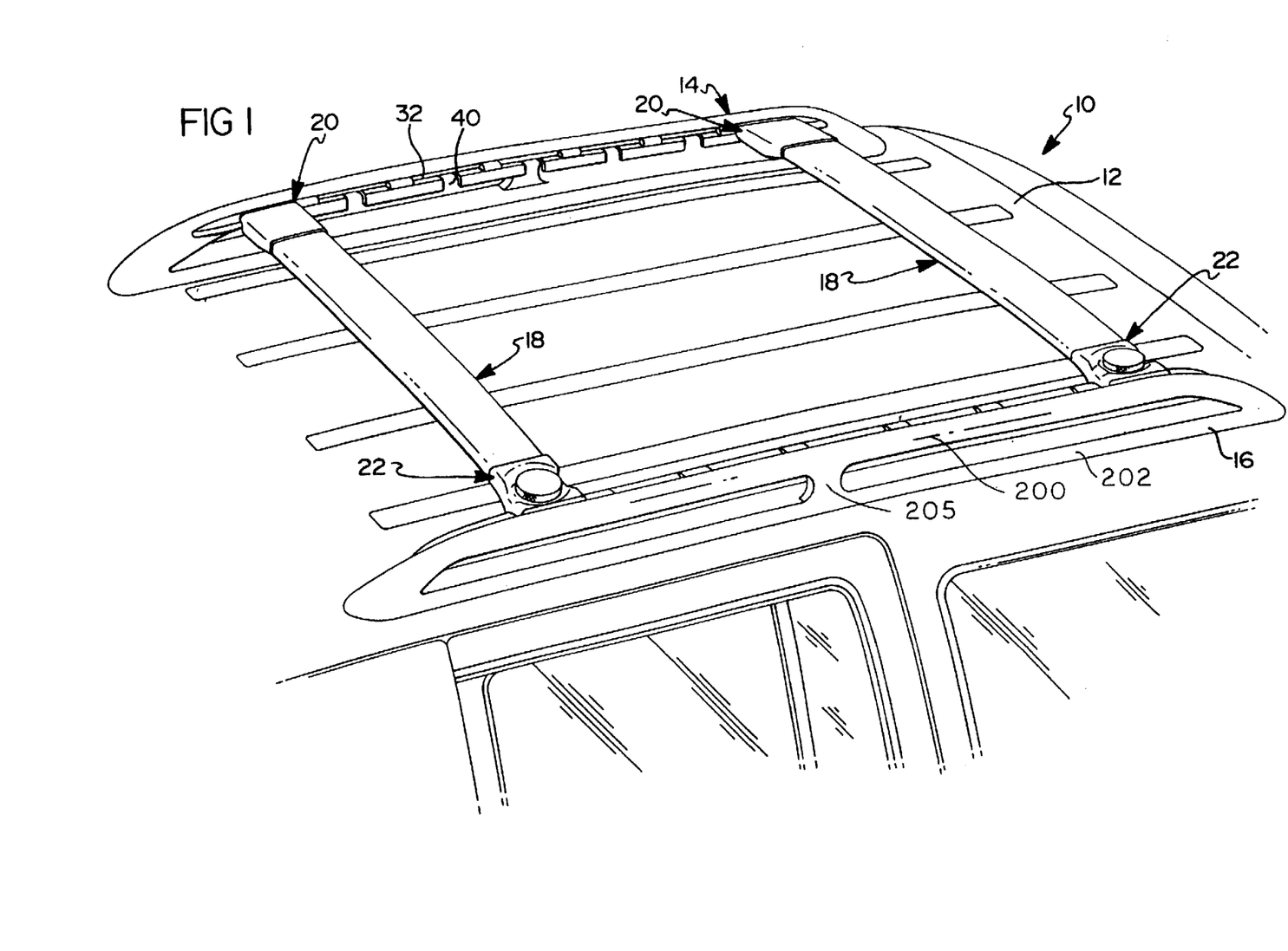
FIG. 1 is a perspective view of a luggage carrier mounted on a motor vehicle and constructed according to the present invention.

Referring first to FIG. 1, an article carrier 10 is thereshown rigidly secured to a motor vehicle roof panel 12 preferably by conventional fasteners. For example, usually, riv nuts are installed in the roof panel to receive bolts. The fasteners may be adaptable to various OEM fasteners such as internally threaded nuts that engage studs mounted to a plate welded on the vehicle panel. The carrier 10 includes left side rail 14 and right side rail 16 and the pair of crossbars 18 extending across the side rails 14 and 16. The crossbars 18 are selectively engageable with the rails 14 and 16 as will be described in greater detail hereinafter. In any event, a left end 20 of each crossbar 18 and right end 22 of each crossbar 18 retain the crossbar in a fixed position with respect to the side rails 14 and 16 as will also be discussed in detail below.

Each of the crossbars 18 may be modified as desired, for example, to include two ends 22 for fixedly securing the ends of the crossbars 18 to the side rails 14 and 16. As a further example, the ends may be constructed as stanchions that raise the crossbars above the side rails. Moreover, it will be understood that the side rails 14 and 16 of each pair may be modified by styling differences, or may be constructed in the same manner as required for engagement of like ends 22 or the differing ends 20 and 22 applied to the crossbars 18, as will be apparent from the examples described in detail.

Figure 2:
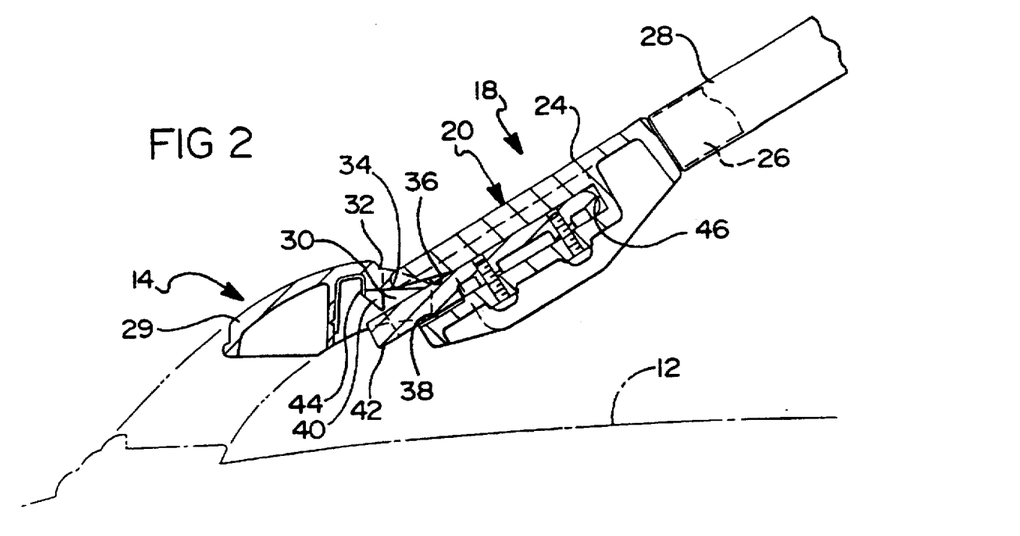
FIG. 2 is a cross-sectional view of a portion of the luggage carrier shown in FIG. 1 and demonstrating an inclined insertion position of one end of the crossbar according to the present invention.

Referring now to FIG. 2, the end 20 comprises a jaw body 24 and a projecting end portion 26 fitting within a tubular cross rail 28. As previously mentioned, the jaw body 24 may be in the form of a stanchion which raises the rail 28 above the side rail 14. As shown in the preferred embodiment, the rail includes a raised portion 29 that supports the rail lip 30 at a raised position above the body panel 12. The lip 30 extends laterally with a socket 32 formed in the upper surface of the rail 14 to provide a fixed crossbar position on the rail. A jaw receiving surface 34 of the rail 14 is engageable against an inclined slide jaw surface 36 on the jaw member 24 of the crossbar 18. A lower jaw surface 38 in the jaw body 24 clears the lower edge of the lip 30 when the crossbar 18 and end 20 are inclined upwardly to the right as shown in FIG. 2. The slide surfaces 36 and 38 define a recess in the jaw body 24 adapted to receive the lip 30.

In addition, side rail 14 includes a slot 40 near the socket 32 adapted to receive a projection 42 carried by the end 20.

In the preferred embodiment, the projection 42 is T-shaped so that the stem fits within the slot 40 in the rail 14, and the transverse portion 43 of the T-shaped projection 42 extends behind the retaining wall 44 at outboard recess 45 on the rail 14. In the preferred embodiment, the projection 42 is separately fabricated for installation in a recess 46 within the jaw body 24 for ease in manufacturing the interlocking end 20 of crossbar 18.

Figure 3:
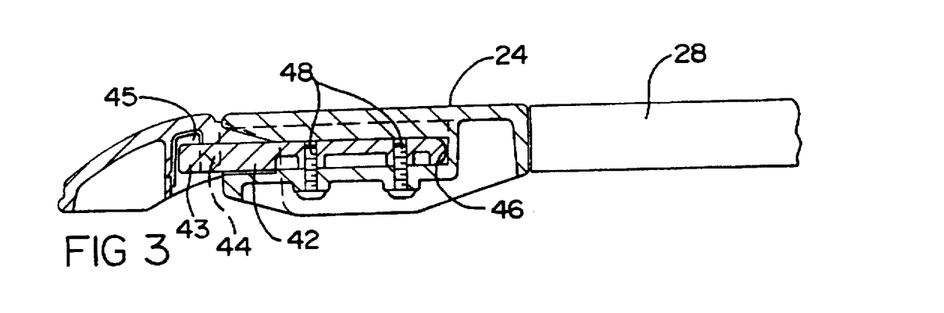
FIG. 3 is a sectional view similar to FIG. 2 but showing the crossbar in an installed alignment position according to the present invention.
Figure 4:
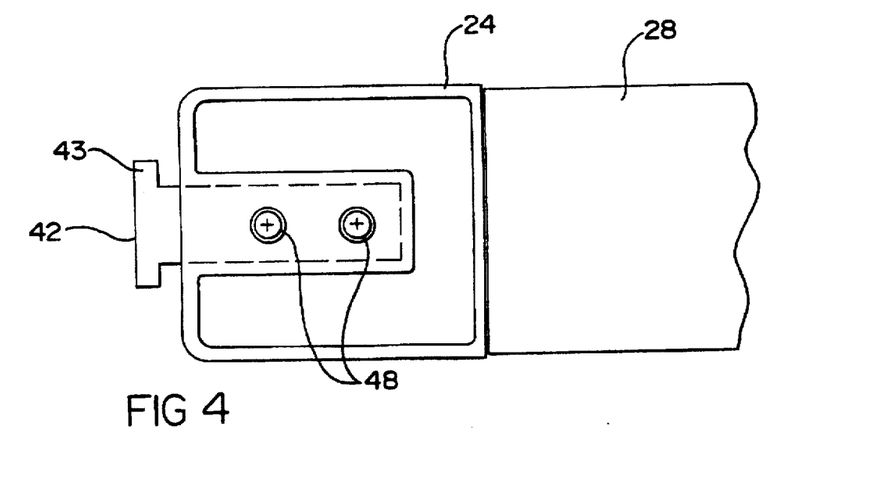
FIG. 4 is a top plan view of a portion of the crossbar shown in FIG. 3.

As the end 20 is inclined so that the surface 36 engages the upper surface of the lip 30, projection 42 bypasses the retaining wall 44 and the lower slide surface 38 extends past the lip 30. As the crossbar 18 is then aligned to a more horizontal position as shown in FIG. 3, the transverse portion 43 of the T-shaped projection 42 becomes retained behind the wall 44 and a portion of the lip 30 supports the slide surface 36. The slide surface 38 prevents upward disengagement of the crossbar 18 from the rail 14. As a result, the crossbar 18 is locked in position laterally as well as vertically and along the direction of the length of the side rail. Nevertheless, in the position shown in FIG. 2, the crossbar may be aligned at any selected socket position 32 along the side rail at which the lip 30 may be received in the recess 46.

Figure 5:
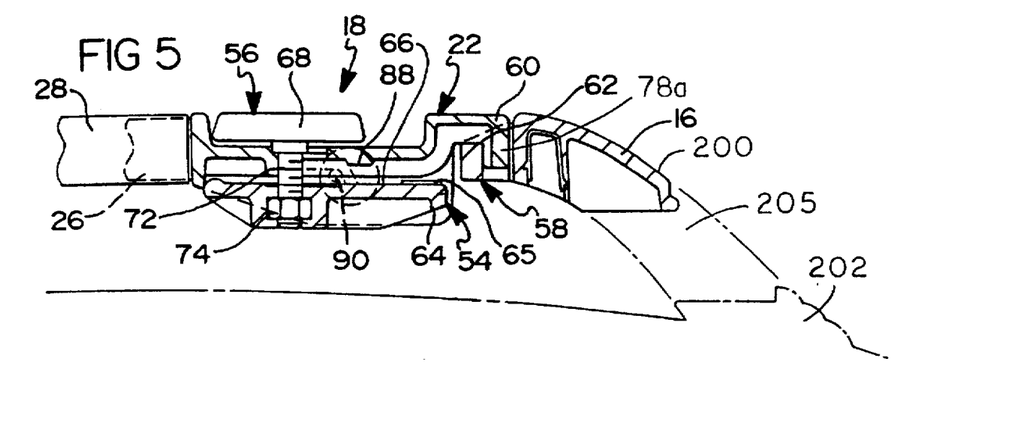
FIG. 5 is an enlarged sectional view of the other end of the crossbar shown in FIG. 1 in an installing position according to the present invention.
Figure 6:
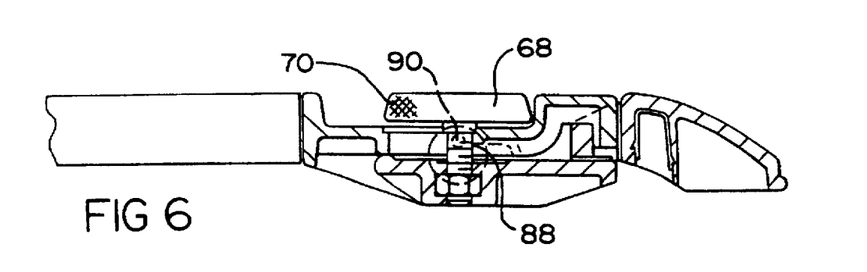
FIG. 6 is a sectional view similar to FIG. 5 but showing the crossbar in a clamped position according to the present invention.
Figure 7:
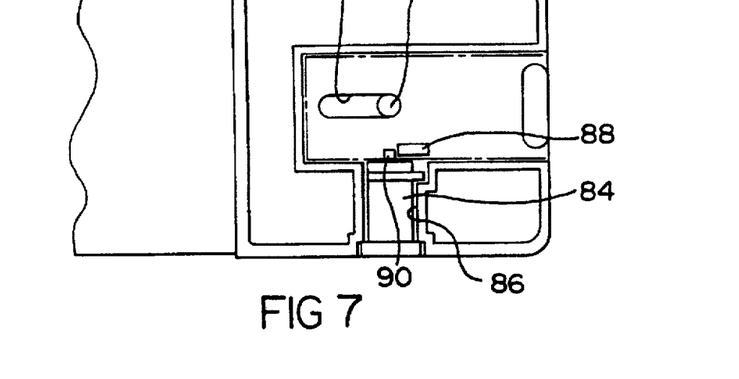
FIG. 7 is a top plan view of a portion of the device shown in FIG. 6.

Referring now to FIGS. 5-7, the other end 22 of crossbar 18 comprises a clamp 54 combined with an actuator 56 for locking the end 22 with the lip 58 of the rail 16. Like the end 20, the end 22 has a projection that fits within tubular rail 28 of the crossbar 18, for example, a projection from the fixed jaw body 60. The jaw body has a fixed jaw surface 62 that matingly engages a surface of the lip 58. A movable jaw 64 includes jaw surface 66 adapted to register with the lower surface of the lip 58.

The actuator 56 for the clamp 54 comprises an enlarged rotary wheel 68 that can be grasped by a user's hand. Preferably, this wheel includes a peripheral, gripping surface such as a knurled surface 70. The wheel 68 is secured at the end of a threaded stem 72 carried by a nut within the movable jaw 64. For example, the jaw 64 may have an opening adapted to receive an octagonal nut, inserted in an opening transverse to the threaded opening receiving the threaded stem 72. Once the threaded stem 72 has been threadably engaged in the nut 74, the end of the threaded stem 72 may be swaged or otherwise deformed, or provided with a nylok fastener or the like, to retain the nut 74 and the threaded stem 72. As a result, the movable jaw 64 is urged against the fixed jaw 60 as the thumb wheel 68 is rotated.

In addition, the fixed jaw 60 includes an elongated slot 76 that permits sliding displacement of the stem carried by movable jaw 64. The jaw 64 slides with respect to the fixed jaw 60 in substantially the same direction as the lower surface of the lip 58. In addition, the fixed jaw 60 includes a projection 78a adapted to be received in a recess in the upper surface of the lip 58. The jaw 60 also has bosses that define a recess adapted to receive the wheel 68 so that the outer surface of the thumb wheel remains flush with the outer surface of the bosses on jaw 60, the rail 16 and the rail portion 28 of the crossbar 18.

As shown in FIG. 7, the end 22 may also include a lock for restricting movement of the jaw 64. In particular, the jaw 60 may carry a lock cylinder 84 rotatably engaged in a socket 86 in the jaw 60. The movable jaw 64 includes a projection 88 that interferes with the axial, eccentric projection 90 on the lock cylinder 84. When the cylinder 84 has been rotated to position the projection 90 in an interfering slide position with respect to the projection 88 on jaw 64, as shown in hidden line in FIG. 6, movement of the projection 88 is obstructed by the pin 90. This obstruction prevents displacement of the movable jaw 64 in the direction away from registration with the lip 58. As a result, even though the jaw 64 might be lowered by rotation of the wheel 68 and separated from the fixed jaw 60, the lock cylinder 84 restricts movement of the lower jaw 64 toward the position shown in FIG. 5. The rotary lock cylinder 84 limits removal.

Figure 8:
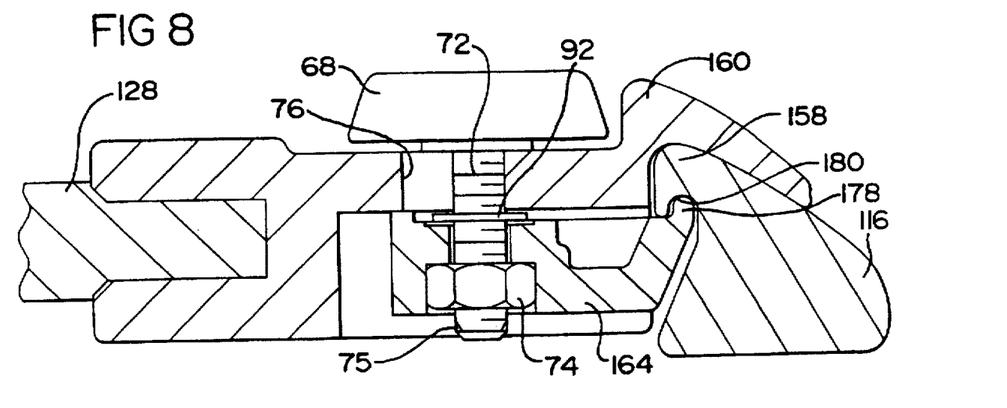
FIG. 8 is an enlarged sectional view similar to FIG. 6 but showing modification of the clamp with a crossbar according to the present invention.

Referring now to FIG. 8, a rail 116 has a lip 158 with a recess 180 in its lower surface. Accordingly, the movable jaw member 164 includes a projection 178 that interlocks the movable jaw 164 with the recess under the lip of the rail 116. Such an arrangement requires greater separation of the movable jaw 164 from the fixed jaw 160, but the additional turns of the wheel 68 and threaded stem permit the thread pitch to be fine to reduce effort required by the user. As shown, the smoother outer surface of the rail 116 protects the recess under the lip from obstruction by debris, snow and the like. As also shown in detail in FIG. 8, the fixed jaw member 160 may be adapted to receive the top rail member 128 within a recess formed in the boss of upper jaw member 160. In addition, swage 75 locks the nut 74 to prevent removal of the nut from the stem. The nut 74 is laterally received in the side-opening recess of movable jaw 164 to prevent axial separation of the nut 74 from movable jaw 164. The snap ring 92 locks the stem 72 in position in the jaw 160 in between the snap ring 92 and the thumb wheel 68 so that rotation of the stem 72 forces the nut 74 and thus the movable jaw 164 to move along the threaded stem 72.

Figure 9:
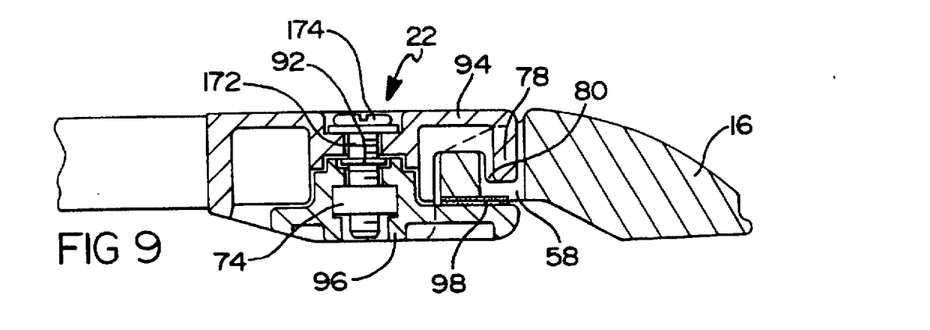
FIG. 9 is an enlarged sectional view similar to FIG. 6 but shown in further modification of the clamp mechanism according to the present invention.
Figure 10:
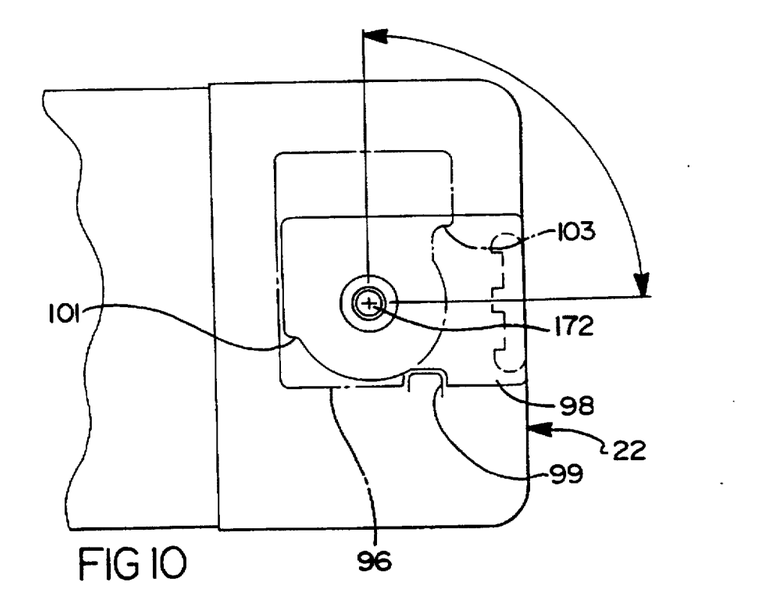
FIG. 10 is a plan view showing movement of a displaceable jaw in the clamp shown in FIG. 9.

Referring now to FIGS. 9 and 10, a modification of the end 22 is shown comprising a fixed jaw 94 and a movable jaw 96. Like the version shown in FIGS. 5-7, the fixed jaw 94 includes a projection 78 adapted to be received in a recess 80 in a lip 58. Moreover, while the movable jaw 96, like the movable jaw 164, has a flat surface for registration with the lower surface of the lip 58, the jaw surface 98 of the movable jaw 96 is displaced in a direction substantially parallel to the lower surface of the lip 58 by rotational movement.

In the preferred form of this embodiment, the threaded stem 172 is carried in the nut 74, and the nut 74 is retained on the stem by staking, swage or the like. Furthermore, the stem is retained in position on upper member 94 by snap ring 92. As the nut lowers and engages the staking, swage or the like, the movable jaw 96 rotates about the axis of the threaded stem away from registration with the lower surface of the lip 58 to the position shown in phantom line in FIG. 10. Moreover, the threaded stem 172 carries an enlarged head 174 adapted to receive a fastener tool, such as the flat head screwdriver, to limit access to removal of the crossbar 18 from the rail 16.

Figure 11:
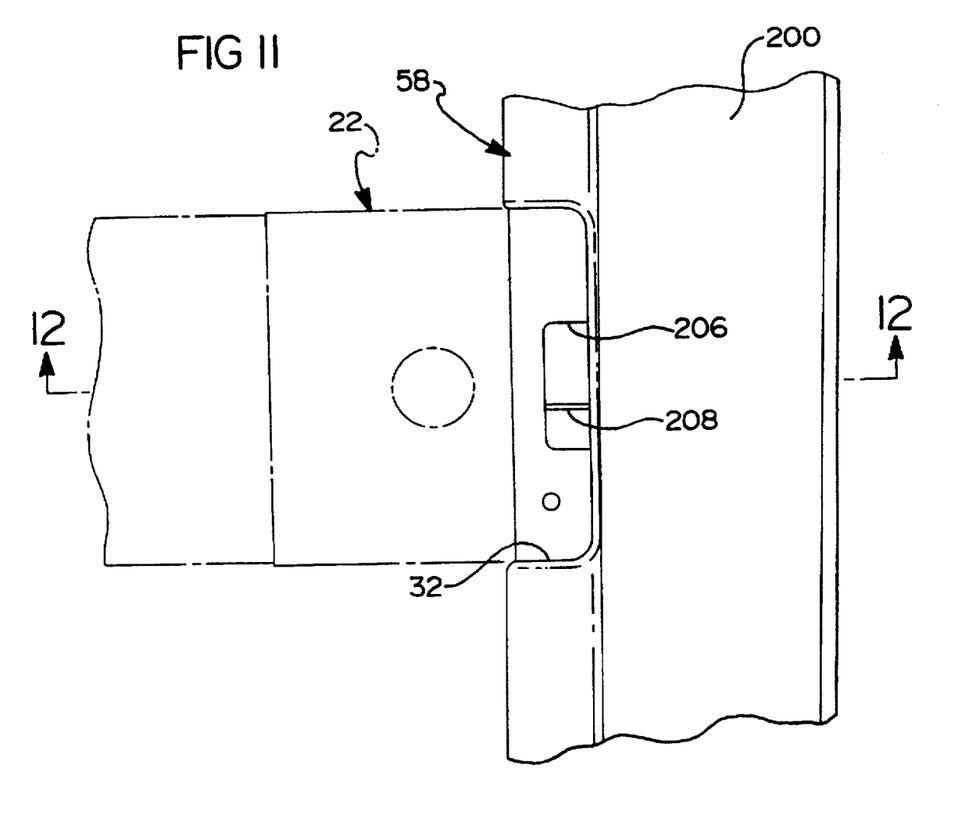
FIG. 11 is an enlarged plan view of a side rail including a lip socket adapted to receive a crossbar end according to the present invention.
Figure 12:
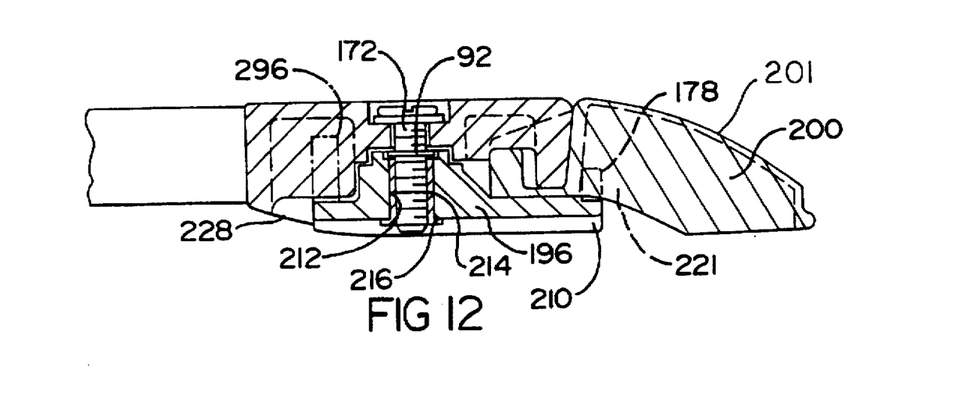
FIG. 12 is a sectional view taken substantially along the line 12—12 in FIG. 11.
Figure 13:
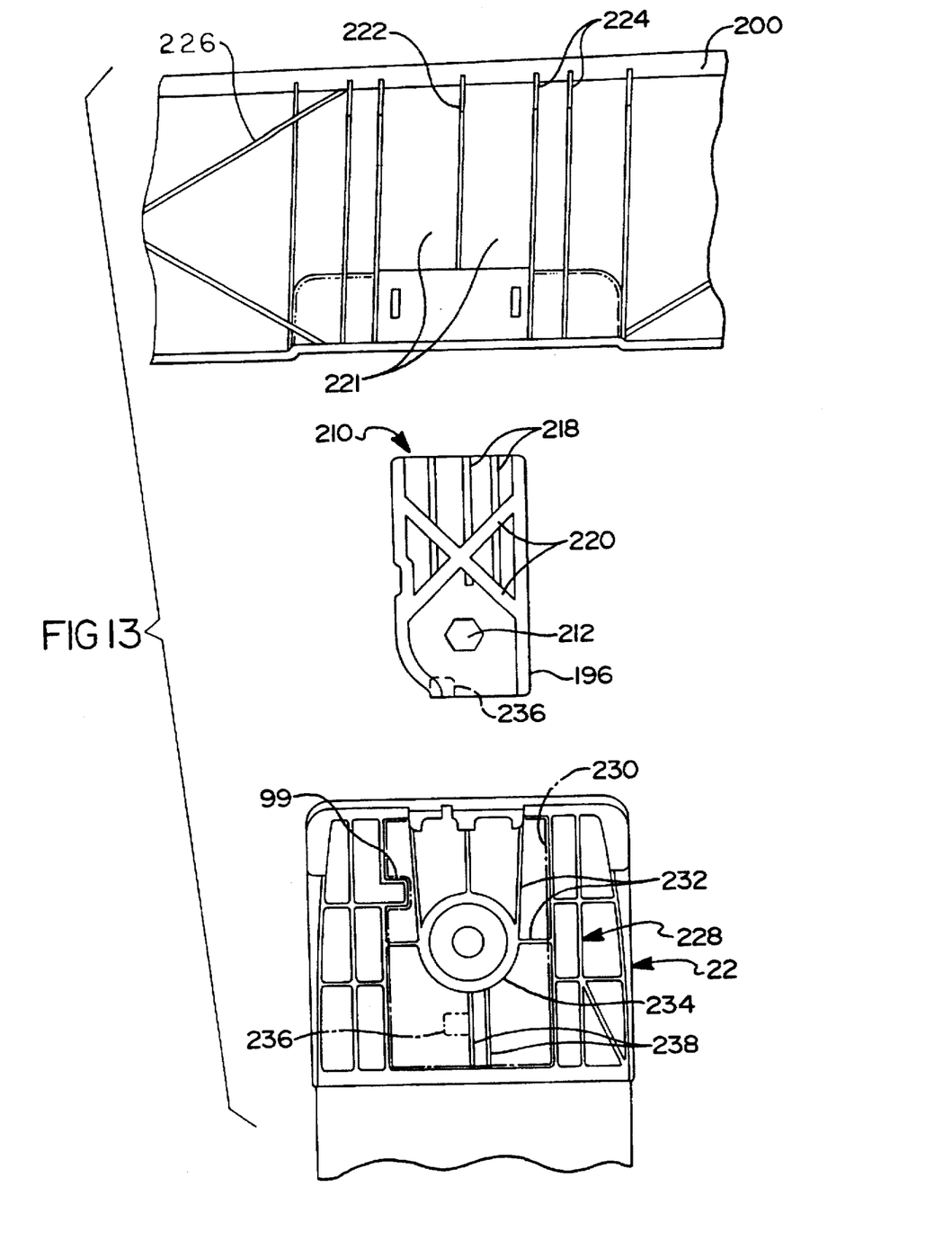
FIG. 13 is an exploded bottom plan view showing components illustrated in FIGS. 11 and 12.

Additional improvements are shown in FIGS. 11-13. The rail 16 shown in FIG. 5 includes an upper arm 200 with a contoured surface 201 held up above a lower portion 202 by stanchion webs 205 FIG. 1. In addition, the long suspended length of the upper arm 200 carries the lip 58 that carries the end 22 of the crossbar. As shown in FIG. 11, the lip 58 includes the socket 32 that receives the end 22 in a fixed position along the upper arm 200. The socket 32 in the lip supports the crossbar at a suspended portion of the arm 200 that does not coincide with the supporting stanchion for the upper arm 200. In addition, a secondary recess 206 receives a projection from the end 22 to assure registration of the end 22 in the socket 32. In addition, a rib 208 extending upwardly from the bottom of the recess 206 fits within a groove at the lower edge of the fixed jaw surface on the end 22.

As shown in FIG. 12, the lower clamp jaw 196 is similar to lower clamping jaw 96 in FIG. 9, but is longer so as to extend outboard beyond the lip 58 to position a projection 178 into a recess 221 in the upper arm 200 in a manner that further strengthens the connection between the crossbar 18 and the side rail 16. As a result, the clamp end 22 may also have a jaw end extending beyond the lip 58 in much the same manner as the retainer end 20 of FIG. 3 includes a transverse portion 43 extending beyond the lip 58 in the outboard recess 45.

In addition, the clamping jaw 196 includes additional reinforcement ribs for structural rigidity of the clamping jaw. In addition to the surfaces employed for forming jaw surfaces, strengthening ribs 210 provide additional resistance to flexing over the elongated clamping surface formed by the extended length to carry the projection 178 outboard of the lip. In addition, the lower clamping jaw 196 includes a hexagonally shaped bore 212 to receive a hexagonal outer diameter of a locking sleeve 214 with a radially enlarged end flange 216. The central bore of the sleeve 214 is correspondingly threaded to receive the bolt 172.

As best shown in FIG. 13, the addition of strengthening ribs 210 on the clamping jaw 196 include a plurality of longitudinal ribs 218 as well as crossing ribs 220 extending between the end ribs form a generally reinforced support structure on the back side of the clamping jaw opposite the clamping jaw surface.

Similarly, the upper arm 200 of the side rail includes reinforcement ribs extending below substantially beyond the socket 32 for rigid support of the end 22 of the crossbar. Furthermore, the end 22 of the crossbar is also reinforced to provide sufficient strength through the clamp formed by the upper and lower jaws. As a result, the upper arm 200 of the side rail is preferably formed with transverse ribs 222 extending from the rear of the socket recess 206 to the outboard edge of the upper rail portion 200 and extended ribs 224 extended beneath the lip and then across the entire width of the upper rail arm 200. Crossing ribs 226 are employed along the upper arm 200 throughout the area between forward and rear sockets 32. The ribs form a simple, generally reinforced support structure between the sockets 32 and the front and rear ends of the upper rail arm 200.

Crisscrossing ribs in a rectangular waffle pattern 228 form a generally reinforced support structure on the bottom of end 22 of the crossbar. The waffle pattern 228 includes the stop 99 along the peripheral wall of a cavity 230 defined by short walled ribs 232 extending from the sleeve support boss 234 toward the edges of the end 22. As a result, when the clamp is tightened to withdraw the clamping jaw 196 into the recess 230, it is rigidly restrained against movement and release within the reinforced support structure.

In addition, as shown at 236 in FIG. 13, a post 296 (FIG. 12) on the clamping jaw 196 extends upwardly into the recess 230, while locking walls 238 below the height of the walls forming the waffle pattern 228, but taller than the recessed ribs 232, define the locked position of the lower clamping jaw. Moreover, when the clamping surface is recessed below the waffle pattern ribs 228, the post 296 (FIG. 12) continues to abut against support ribs 238 as shown at 236 in the end 22 of FIG. 13. As a result, when released, the clamping jaw 196 can turn only in a single direction and for a limited turn until the post 296 at shoulder 101 engages the stop 99. In any event, the pocket or recess 230 is reinforced by the waffle pattern walls 228, the locking walls 238 and the recessed ribs 232 without adding a substantial amount of weight to the material forming the end 22. As a result, the joint formed by connection of the end 22 to the side rail is lighter but substantially stronger than previously known stylized side rail designs and stylized cross rail members.

As a result, it will be understood that crossbar 18 shown in the preferred embodiment of the present invention is easily attached to the side rails mounted on vehicle body panel. In particular, the end 20 is inclined as shown in FIG. 2 and positioned for engagement at one of the sockets 32 and entry of the projection 42 in the slot 40. Then, with the lower jaw member 64 in the position shown in FIG. 5, or the jaw member 96 shown in the position in phantom line in FIG. 10, at which position shoulder 101 engages stop 99, the end 22 of the crossbar 18 is lowered into engagement with the rail 16. Accordingly, the lower jaw 64 is then slid along the slot 76 to the position shown in FIG. 6, or the jaw 96 is rotated to the position shown in solid line in FIG. 10 to engage the shoulder 103 against stop 99, placing the jaw surface 65 or jaw surface 98 in registration with the lower surface of the lip 58 by movement substantially in the direction of the plane of the lower surface of the lip 58. The lower jaw is then slid or rotated into a position in registration with the lower surface of the lip and the threaded stem is tightened to engage the fixed jaw and the movable jaw against opposite surfaces of the rail lip. When the optional locking cylinder 84 is provided in conjunction with the clamp 54, the crossbar 18 may be maintained in its attached position on the rails 14 and 16 until the cylinder is rotated to remove the projection 90 from its obstructing position with respect to the sliding projection 88 on the movable jaw.

Having thus described the present invention, many modifications thereto will become apparent to those skilled in the art to which it pertains without departing from the scope and spirit of the present invention as defined in the appended claims.

What is claimed is:

1. An article carrier for mounting on a vehicle comprising:
   a pair of longitudinally extending side rails, each side rail having a suspended portion intermediate support stanchions and a laterally inwardly extending lip along said suspended portion;
   a plurality of longitudinally spaced apart slots formed in said side rail adjacent said lip; and
   a retaining wall positioned outboard of said lip and said slots;
   at least one crossbar having a first end and a second end;
   said first end including a jaw body having opposing spaced apart first and second jaw surfaces engaging said lip; and
   a first jaw extension located between said first and second jaw surfaces;
   said jaw extension protruding past said lip through said slot and behind said retaining wall to limit movement of said crossbar laterally, vertically, and longitudinally.

2. The carrier as defined in claim 1 wherein said jaw extension includes a protrusion and said rail suspended portion includes a recess adapted to receive said protrusion.

3. The carrier as defined in claim 2 wherein said recess is formed in a generally reinforced pattern of ribs.

4. The carrier as defined in claim 1 wherein said second end comprises a clamp.

5. The carrier as defined in claim 4 wherein said clamp comprises a fixed jaw and a movable jaw.

6. The invention as defined in claim 5 wherein said lip includes a socket and said fixed jaw is sized to fit in said socket.

7. The carrier as defined in claim 5 wherein a second jaw extension is carried by said movable jaw.

8. The invention as defined in claim 5 wherein said fixed jaw includes a recess dimensioned to receive said movable jaw when said clamp is tightened.

9. The carrier as defined in claim 5 wherein said fixed jaw includes a stop for limiting displacement of said movable jaw with respect to said fixed jaw.

10. The carrier as defined in claim 1 wherein said extension comprises a T-shaped projection.

11. The invention as defined in claim 1, wherein one of said first and second jaw surfaces is positioned at an inclined angle to allow said crossbar to be removed by pivoting said crossbar upwardly about said lip.

12. An article carrier for mounting to a vehicle body panel comprises:
- a pair of longitudinally extending side rails, each side rail having a styled arm with a contoured surface and a lip protruding laterally from said arm;
- a support structure including reinforcing ribs externally extending from each said lip across a majority of a width of said styled arm;
- a crossbar having ends for respective connection with said lip, at least one said end having a clamp including a fixed jaw and a movable jaw, each said jaw including a jaw surface relatively displaceable with respect to the other jaw surface for registration with said lip.

13. The carrier as defined in claim 12 wherein said lip includes a socket dimensioned to receive one of said jaw surfaces.

14. The carrier as defined in claim 12 wherein one of said fixed and movable jaw members protrudes beyond said lip into said support structure.

15. The invention as defined in claim 12 wherein said support structure includes a recess and one jaw member includes a protrusion dimensioned to be received in said recess.

16. The carrier as defined in claim 12 wherein said styled arm is supported by spaced stanchions suspending a portion of said arm above said body panel.

17. The carrier as defined in claim 16 wherein said suspended portion includes a lip socket dimensioned to receive one of said jaw surfaces.

18. The article carrier of claim 12, wherein said clamp includes a stem carried by said movable jaw and wherein said fixed jaw includes an elongated slot in which said stem is slidably received.

19. An article carrier for a motor vehicle body panel comprises:
- a pair of side rails including mounts for securing the rails in spaced alignment on the body panel wherein each of said side rails includes a laterally extending lip defining an innermost end of said side rail;
- at least one crossbar having first and second ends for supporting the crossbar to extend across said pair of side rails;
- at least one of said ends having a clamp including a movable jaw and a fixed jaw, wherein each said jaw has a jaw surface engageable with one of the rail lips;
- said clamp having a stem carried by said movable jaw and extending through said fixed jaw, whereby said movable jaw is movable in a direction parallel to a bottom surface on said one rail lip between a first position where said movable jaw surface is in registration with said one lip when said fixed jaw surface is in registration with said one lip and a second position in said direction where said movable jaw surface is not in registration with said one lip when said fixed jaw member is in registration with said one lip;

wherein at least one of said side rails includes a socket formed in a lower surface of the associated rail to provide a fixed crossbar position on said associated rail and said crossbar clamp includes at least one portion of said jaw surfaces dimensioned to be received within said socket in said fixed crossbar position thereby preventing movement of said at least one crossbar along the length of the associated rail.

20. The carrier as defined in claim 19 wherein said socket is a recess.

21. The invention as defined in claim 19 wherein said portion is a projection.

22. A crossbar for an article carrier including a pair of side rails, wherein each of said side rails includes a lip, said crossbar comprising:
- a bar having first and second ends for supporting the bar to extend across the pair of side rails;
- at least one of said ends comprising a clamp having a movable jaw and a fixed jaw wherein each of said jaws has a jaw surface engageable with one of the rail lips;
- said clamp having a stem carried by said movable jaw and extending through said fixed jaw, whereby said movable jaw pivots about said stem in a plane substantially parallel to a bottom surface of the one rail lip, said clamp supporting said movable jaw between a first position where said movable jaw surface is in registration with said adjacent surface on the one lip when said fixed jaw surface is in registration with the one lip and a second position in said plane where said movable jaw surface is not in registration with the one lip when said fixed jaw member is in registration with the one lip, wherein said clamp includes a stop restricting rotation of said movable jaw at said first and second positions;

wherein said movable jaw surface has a protrusion, and said rail has a recess that is dimensioned to receive said protrusion.

23. A crossbar for an article carrier including a pair of side rails, wherein each of said side rails includes a lip, said crossbar comprising:
- a bar having first and second ends for supporting the bar to extend across the pair of side rails;
- at least one of said ends comprising a clamp having a movable jaw and a fixed jaw wherein each of said jaws has a jaw surface engageable with one of the rail lips;
- said clamp having a stem carried by said movable jaw and extending through said fixed jaw, whereby said movable jaw rotates around said stem in a plane substantially parallel to a bottom surface of the one rail lip, said clamp supporting said movable jaw between a first position where said movable jaw surface is in registration with said adjacent surface on the one lip when said fixed jaw surface is in registration with the one lip and a second position in said plane where said movable jaw surface is not in registration with the one lip when said fixed jaw member is in registration with the one lip;

wherein said clamp includes a stop restricting rotation of said movable jaw at said first and second positions.

24. An article carrier for a motor vehicle body panel comprises:
- a pair of side rails including mounts for securing the rails in spaced alignment on the body panel wherein each of said side rails includes a lip defining an innermost end of said side rail wherein said lip laterally extends toward the other of said side rails;
- at least one crossbar having first and second ends for supporting the crossbar to extend across said pair of side rails;

at least one of said ends having a clamp including a movable jaw and a fixed jaw, wherein each said jaw has a jaw surface engageable with one of the rail lips;

said clamp having a stem carried by said movable jaw and extending through said fixed jaw, whereby said movable jaw is movable in a direction substantially parallel to a surface on said one rail lip between a first position where said movable jaw surface is in registration with said one lip when said fixed jaw surface is in registration with said one lip and a second position in said direction where said movable jaw surface is not in registration with said one lip when said fixed jaw member is in registration with said one lip;

wherein said one lip includes a socket formed in an upper surface of said rail to provide a fixed crossbar position on said rail and said crossbar clamp includes at least one of said jaw surfaces dimensioned to be received in said socket in said lip;

wherein said rail includes a recess near said socket, and said clamp includes an upwardly extending jaw projection dimensioned to be received in said recess; and wherein said projection is on said movable jaw.

25. An article carrier for mounting on a vehicle comprising:

a pair of side rails, each side rail having a suspended portion intermediate support stanchions and a lip along said suspended portion;

at least one crossbar having a first end and a second end, at least one of said first and second ends including first and second jaw surfaces engaging said lip, and said at least one of said ends including a jaw extension protruding beyond said lip;

wherein said jaw extension includes a protrusion and said rail suspended portion includes a recess adapted to receive said protrusion; and wherein said recess is formed in a generally reinforced pattern of ribs.

* * * * *

UNITED STATES PATENT AND TRADEMARK OFFICE
CERTIFICATE OF CORRECTION

PATENT NO. : 5,732,864
DATED : March 31, 1998
INVENTOR(S) : Stapleton

It is certified that error appears in the above-indentified patent and that said Letters Patent is hereby corrected as shown below:

Claim 6, Column 8, line 63, the word "invention" should be --carrier--.
Claim 11, Column 9, line 8, the word "invention" should be --carrier--.
Claim 15, Column 9, line 32, the word "invention" should be --carrier--.
Claim 21, Column 10, line 11, the word "invention" should be --carrier--.

Signed and Sealed this

Fourteenth Day of July, 1998

Attest:

BRUCE LEHMAN

*Attesting Officer*        *Commissioner of Patents and Trademarks*